(12) United States Patent
Chauvin

(10) Patent No.: US 7,799,862 B2
(45) Date of Patent: *Sep. 21, 2010

(54) RUBBER COMPOSITION FOR A TIRE CROWN REINFORCEMENT

(75) Inventor: Brigitte Chauvin, Chamalieres (FR)

(73) Assignee: Michelin-Recherche et Technique S.A., Granges-Paccot (CH)

( * ) Notice: Subject to any disclaimer, the term of this patent is extended or adjusted under 35 U.S.C. 154(b) by 401 days.

This patent is subject to a terminal disclaimer.

(21) Appl. No.: 10/702,753

(22) Filed: Nov. 6, 2003

(65) Prior Publication Data

US 2004/0092647 A1    May 13, 2004

Related U.S. Application Data

(63) Continuation of application No. PCT/EP02/05020, filed on May 7, 2002.

(30) Foreign Application Priority Data

May 16, 2001  (FR) .................................. 01 06490

(51) Int. Cl.
*B60C 1/00*    (2006.01)
*C08K 3/04*    (2006.01)

(52) U.S. Cl. ...................... 524/496; 524/495; 524/571; 152/151

(58) Field of Classification Search .................. 524/496
See application file for complete search history.

(56) References Cited

U.S. PATENT DOCUMENTS

| 4,477,621 A | * | 10/1984 | Sato et al. ................... 524/496 |
| 5,394,919 A | * | 3/1995 | Sandstrom et al. .......... 152/537 |
| 6,420,488 B1 | * | 7/2002 | Penot ...................... 525/332.7 |
| 2005/0222318 A1 | * | 10/2005 | Chauvin ..................... 524/496 |

FOREIGN PATENT DOCUMENTS

FR    2721038 A1  *  12/1995

OTHER PUBLICATIONS

Machine translation of FR 2 721 038 A1, Dec. 15, 1995.*
Full English-language translation of FR 2 721 038 A1, Dec. 15, 1995.*

* cited by examiner

*Primary Examiner*—Vickey Nerangis
(74) *Attorney, Agent, or Firm*—Buchanan Ingersoll & Rooney PC

(57) ABSTRACT

A composition having a reduced hysteresis which is usable in a crown reinforcement for a heavy-vehicle tire, includes an elastomeric matrix comprising natural rubber or a synthetic polyisoprene in a majority proportion, and a reinforcing filler comprising a carbon black, where the carbon black fulfills the following conditions: (i) $45 \leq CTAB$ specific surface area in $m^2/g \leq 70$, (ii) $45 \leq BET$ specific surface area in $m^2/g \leq 70$, (iii) $45 \leq$ iodine adsorption index IA in $mg/g \leq 70$, (iv) ratio (BET surface area/index IA)$\leq 1.07$, (v) $115 \leq DBP$ structure value in $ml/100 \ g \leq 170$, (vi) $85 \ nm \leq$ Stokes diameter dst in $nm \leq 145$, where dst is the diameter of aggregates corresponding to the maximum frequency of the Stokes diameters in a distribution of aggregates, and (vii) $D50/dst \leq 0.0090 \cdot CTAB + 0.19$, where D50 is the difference, in the distribution of aggregates, between the Stokes diameters of two aggregates corresponding to one and the same frequency equal to 50% of the maximum frequency of the Stokes diameters, dst and D50 being measured by centrifugal photosedimentometry.

13 Claims, No Drawings

RUBBER COMPOSITION FOR A TIRE CROWN REINFORCEMENT

The present application is a continuation of International Patent Application No. PCT/EP02/05020, filed May 7, 2002, and published in French as International Publication No. WO 02/092680 on Nov. 21, 2002, claiming priority to French Patent Application FR 01/06490, filed May 16, 2001.

The present invention relates to a rubber composition having a reduced hysteresis which is usable in a crown reinforcement for a heavy load bearing tire, such as a heavy-vehicle or construction-vehicle tire. The invention also relates to a crown reinforcement and a tire of this type.

Radial-carcass tires for motor vehicles bearing heavy loads, in particular for heavy vehicles, comprise reinforcements which are formed of reinforcements or plies of metal wires coated with elastomers. More precisely, these tires comprise, in their bottom zone, one or more bead wires, a carcass reinforcement extending from one bead wire to the other and, in the crown of the tire, a crown reinforcement comprising at least two crown plies.

These heavy-vehicle tires are designed to be able to be recapped one or more times when the treads reach a critical degree of wear after prolonged travel. Recapping involves taking the carcass, which has a crown reinforcement not subjected to significant damage, after prolonged travel and applying the new treads onto the carcass thereby recapping the tire.

The crown reinforcement must be as cohesive as possible in order to withstand the mechanical stresses during travel. It must have high rigidity at low deformation, because the crown reinforcement contributes substantially to the stiffening of the crown of the tire. Its hysteresis must be as low as possible in order to minimize the heating during travel of the inner zone of the crown. A low hysteresis also limits the thermochemical and thermo-oxidizing change of the internal compositions. Furthermore, it is desired to minimize tire embrittlement to delay the appearance of damage therein at the ends of the crown plies, or the "shoulder" zone of the tire.

One of skill in the art is well aware of a rubber composition for a crown reinforcement having a quantity of approximately 50 phr (parts by weight per hundred parts of elastomer(s)), and a relatively structured grade 300 carbon black, such as the black N347, that exhibits improved cohesion, endurance and hysteresis. Such a rubber composition imparts a longer life to the crown reinforcement and, consequently, to the corresponding tire comprising the crown reinforcement.

It is also known that coarse carbon blacks, such as the black N539, only impart sufficient cohesion to a crown reinforcement composition if they are present in the composition in very large quantities. However, such large quantities have the undesirable effect of adversely affecting the hysteresis of the composition.

Japanese patent specification JP-A-04/274 901 discloses the use of specific carbon blacks distributed in at least three rubber compositions corresponding to various zones of one tire of reduced weight to impart improved rolling resistance and reinforcement properties. This tire was compared to a tire having the same zones comprising rubber compositions comprising grade 300 carbon black.

These specific carbon blacks have a specific surface area $N_2SA$ (measured in accordance with Standard ASTM D3037 of 1984) of from 60 to 84 $m^2/g$, a "DBP" structure value (measured in accordance with Standard JIS K 6221) of from 120 to 200 ml/100 g and a surface chemistry wherein the ratio "$N_2SA/IA$" of said specific surface area to the iodine adsorption index "IA" (also measured in accordance with Standard JIS K 6221) is equal to or greater than 1.10.

Japanese patent specification JP-A-02/103 268 discloses the use of carbon blacks to improve the hysteresis and reinforcement properties of rubber compositions for carcass reinforcements of a tire, or generally intended for damping vibrations.

These carbon blacks have a CTAB specific surface area (measured in accordance with Standard ASTM D3765-80) of from 50 to 75 $m^2/g$, a "DBP" structure value (measured in accordance with Standard JIS K 6221) equal to or greater than 105 ml/100 g and a surface chemistry wherein that the ratio "$N_2SA/IA$" of the specific surface area "$N_2SA$" (measured in accordance with Standard ASTM D3037-86) to the iodine adsorption index "IA" (measured in accordance with Standard JIS K 6221) is equal to or greater than 1.10.

These last two documents do not disclose rubber compositions specifically intended for a crown reinforcement of a tire which is intended to bear heavy loads.

SUMMARY OF THE INVENTION

The present invention relates to a rubber composition having a reduced hysteresis which is usable in a crown reinforcement for a heavy load bearing tire, such as a heavy-vehicle or construction-vehicle tire. The invention also relates to a crown reinforcement and a tire of this type. The rubber composition according to the invention comprises an elastomeric matrix comprising natural rubber or a synthetic polyisoprene in a majority proportion, and a reinforcing filler comprising a carbon black, where the carbon black satisfies the following conditions:
- (i) $45 \leq$ CTAB specific surface area in $m^2/g$ (in accordance with Standard ASTM D3765-80) $\leq 70$,
- (ii) $45 \leq$ BET specific surface area in $m^2/g$ (in accordance with Standard ASTM D4820-93) $\leq 70$,
- (iii) $45 \leq$ iodine adsorption index IA in mg/g (in accordance with Standard ASTM D1510-81) $\leq 70$
- (iv) ratio (BET surface area/index IA) $\leq 1.07$,
- (v) $115 \leq$ DBP structure value in ml/100 g (in accordance with Standard ASTM D2414-93) $\leq 170$,
- (vi) 85 nm $\leq$ Stokes diameter dst in nm $\leq 145$, where dst is the diameter of aggregates corresponding to the maximum frequency of the Stokes diameters in a distribution of aggregates, and
- (vii) $D50/dst \geq 0.0090 \cdot CTAB + 0.19$, where D50 is the difference, in the distribution of aggregates, between the Stokes diameters of two aggregates corresponding to one and the same frequency equal to 50% of the maximum frequency of the Stokes diameters, dst and D50 being measured by centrifugal photosedimentometry.

DETAILED DESCRIPTION OF THE INVENTION

In accordance with the invention, it has been surprisingly discovered that the association of an elastomeric matrix comprising natural rubber or a synthetic polyisoprene in a majority proportion and a reinforcing filler comprising a carbon black, satisfying all of the following conditions:
- (i) $45 \leq$ CTAB specific surface area in $m^2/g$ (in accordance with Standard ASTM D3765-80) $\leq 70$,
- (ii) $45 \leq$ BET specific surface area in $m^2/g$ (in accordance with Standard ASTM D4820-93) $\leq 70$,
- (iii) $45 \leq$ iodine adsorption index IA in mg/g (in accordance with Standard ASTM D1510-81) $\leq 70$
- (iv) ratio (BET surface area/index IA) $\leq 1.07$,
- (v) $115 \leq$ DBP structure value in ml/100 g (in accordance with Standard ASTM D2414-93) $\leq 170$,
- (vi) 85 nm $\leq$ Stokes diameter dst in nm $\leq 145$, where dst is the diameter of aggregates corresponding to the maximum frequency of the Stokes diameters in a distribution of aggregates, and (vii) D50/dst≧0.0090.CTAB+0.19, where D50 is the difference, in the distribution of aggregates, between the Stokes diameters of two aggregates corresponding to one and the same frequency equal to 50% of the maximum frequency of the Stokes diameters, dst and D50 being measured by centrifugal photosedimentometry produces a cross-linkable or cross-linked rubber composition which is usable in a crown reinforcement of a heavy-vehicle or construction-vehicle tire.

In the cross-linked state, the rubber composition exhibits improved hysteresis properties at high deformations, in comparison to the hysteresis properties of known compositions comprising a grade 300 carbon black, while having the same modulus of elongation at low deformation.

It will be noted that the carbon blacks usable in the crown reinforcement compositions of the invention differ from the carbon blacks used in the prior art by the relatively low value of the ratio (BET surface area/index IA) and by the ratio D50/dst which increases with the CTAB specific surface area. These ratios imparting a particularly suitable surface chemistry and morphology.

The elastomeric matrix of the rubber composition according to the invention may advantageously be formed of natural rubber or synthetic polyisoprene, or alternatively of a blend of natural rubber or synthetic polyisoprene with one or more additional diene elastomers.

When the elastomeric matrix is a blend of natural rubber or synthetic polyisoprene and one or more additional diene elastomer, the natural rubber or the synthetic polyisoprene is present in a majority proportion in the matrix, i.e., greater than 50 phr (parts by weight per hundred parts of elastomers). Preferably, the natural rubber or the polyisoprene is present in a quantity greater than 70 phr.

The following diene elastomers may be used in a blend with the natural rubber or the synthetic polyisoprene: polybutadienes, stirene-butadiene copolymers (SBR) prepared in solution or in emulsion, butadiene-isoprene copolymers (BIR) and styrene-butadiene-isoprene terpolymers (SBIR). These diene elastomers may be functional or not.

Preferably, the polybutadiene comprises a majority of cis-1,4 linkages and the SBR comprises a majority of trans-1,4 linkages.

The diene elastomers may be modified during or after polymerization by means of branching agents such as divinylbenzene, coupling or starring agents such as carbonates, halo-tins, halo-silicons, functionalizing agents resulting in grafting on the chain or at the chain end of hydroxyl, carbonyl, carboxyl groups or alternatively of amine groups (for example by means of dimethylamino-benzophenone or diethylamino-benzophenone as functionalizing agent).

According to another characteristic of the invention, the carbon black also satisfies the following condition:

(viii) 80≦DBPC structure value in ml/100 g (in accordance with Standard ASTM D3493-91)≦130, DBPC being measured after 4 compressions at 24,000 psi.

Preferably, this condition (viii) is as follows:

(viii) 85≦DBPC structure value in ml/100 g≦125.

In an embodiment of the invention, the carbon black used in the composition satisfies conditions (i) to (iii) as follows:

(i) 50≦CTAB specific surface area in m$^2$/g≦65, (ii) 50≦BET specific surface area in m$^2$/g≦65, (iii) 50≦iodine adsorption index IA in mg/g≦65.

In another embodiment of the invention, the carbon black according to the invention satisfies condition (iv) is as follows:

(iv) ratio (BET surface area)/(index IA)≦1.05.

In another embodiment of the invention, the carbon black according to the invention satisfies condition (v) is as follows:

(v) 120≦DBP structure value in ml/100 g≦165.

In another embodiment of the invention, the carbon black according to the invention satisfies condition (vi) is as follows:

(vi) 90 nm≦Stokes diameter dst in nm≦140.

In another embodiment of the invention, the carbon black according to the invention satisfies condition (vii) is as follows:

(vii) D50/dst≧0.0092.CTAB+0.21.

The values dst and D50 were measured using a centrifugal photosedimentometer type "DCP" (Disk Centrifuge Photosedimentometer), sold by Brookhaven Instruments. The operating method for these measurements is as described below.

A sample of carbon black was dried, in accordance with Standard JIS K6221 (1975). Then 10 mg of dried carbon black is suspended in 40 ml of an aqueous solution of 15% ethanol and 0.05% of a non-ionic surfactant (by volume).

The dispersion of carbon black was obtained by ultrasound treatment for 10 minutes using a 600 Watt ultrasonic probe. An ultrasound generator designated "Vibracell ½ inch" sold by Bioblock and adjusted to 60% of its power (namely to 60% of maximum amplitude) was used.

A gradient solution composed of 15 ml water (with 0.05% non-ionic surfactant) and 1 ml ethanol was injected into the disc of the sedimentometer, rotating at 8,000 rpm. Then, 0.30 ml of the suspension of carbon black was injected on to the surface of the gradient solution. The mass size distribution curve was recorded for 120 minutes. A software program provided said values dst and D50 in nm.

The carbon black according to the invention may be used on its own as reinforcing filler, or alternatively in a blend with a reinforcing inorganic filler. The quantity of carbon black used may vary from about 30 phr to about 70 phr and, preferably, from 35 to 65 phr.

When used in a blend with a reinforcing inorganic filler, the carbon black is present in a majority proportion in the reinforcing filler (i.e. in a mass fraction greater than 50%). Preferably, the mass fraction of carbon black in the reinforcing filler is greater than 70%.

As is well known in the art, "reinforcing inorganic filler" is understood to mean an inorganic or mineral filler, independent of color and origin (natural or synthetic). It may be referred to as a "white" or "clear" filler, in contrast to carbon black. The inorganic filler is capable, without any other means than an intermediate coupling agent, of reinforcing a rubber composition intended for the manufacture of tires. The reinforcing inorganic filler is capable of replacing a conventional tire-grade carbon black filler in its reinforcement function.

In a preferred embodiment of the invention, all or at least a majority proportion of the reinforcing inorganic filler is silica (SiO$_2$). The silica used may be any reinforcing silica known to the person skilled in the art, in particular any precipitated silica having a BET surface area and a CTAB specific surface area both of which are less than 450 m$^2$/g, even if the highly dispersible precipitated silicas are preferred.

In a more preferred embodiment of the invention, said silica has BET or CTAB specific surface areas both of which are from 70 to 250 m$^2$/g and, preferably, from 80 to 240 m$^2$/g.

The BET specific surface area of the silica is determined in known manner, in accordance with the method of Brunauer, Emmett and Teller described in "The Journal of the American Chemical Society" vol. 60, page 309, February 1938, corresponding to Standard AFNOR-NFT 45007 (November 1987). The CTAB specific surface area is the external surface area determined in accordance with the same Standard AFNOR-NFT-45007 of November 1987.

"Highly dispersible silica" is understood to mean any silica having a very substantial ability to disagglomerate and to disperse in an elastomeric matrix, which can be observed in known manner by electron or optical microscopy on thin sections. Non-limiting examples of such preferred highly dispersible silicas include the silicas Perkasil KS 430 from Akzo, the silicas BV3380 and BV3370GR from Degussa, the silicas Zeosil 1165 MP and 1115 MP from Rhodia, the silica Hi-Sil 2000 from PPG, the silicas Zeopol 8741 or 8745 from Huber, and treated precipitated silicas such as, for example, the aluminium-"doped" silicas described in European patent specification EP-A-0 735 088.

Other silicas which are not highly dispersible, such as the silica Perkasil KS404 from Akzo and the silicas Ultrasil VN2 or VN3, may also be used.

The physical state in which the reinforcing inorganic filler is present is immaterial and may be in the form of a powder, microbeads, granules or balls. Of course, "reinforcing inorganic filler" is also understood to mean mixtures of different reinforcing inorganic fillers, in particular of highly dispersible silicas such as described above.

It is also possible to use in a non-limiting fashion, aluminas (of formula $Al_2O_3$), such as the aluminas of high dispersibility which are described in European patent specification EP-A-810 258 as the reinforcing inorganic filler. Alternatively, aluminium hydroxides, such as those described in international patent specification WO-A-99/28376, may also be used in the reinforcing inorganic filler of the present invention.

Also suitable as reinforcing inorganic fillers are carbon blacks modified by silica, such as, although this is not limiting, the fillers sold by CABOT under the name "CRX 2000", described in international patent specification WO-A-96/37547.

The compositions according to the invention are capable of cross-linking under the action of sulphur, peroxides or bis-maleimides in the presence or absence of sulphur. They may also contain the other constituents conventionally used in rubber mixes, such as plasticizers, pigments, antioxidants, processing agents, cross-linking accelerators such as benzothiazol derivatives and diphenylguanidine. In the present case of rubber compositions for crown reinforcements, the compositions have satisfactory adhesion to the metal, a cobalt salt and/or a silica/resin association.

The compositions according to the invention may be prepared using known thermomechanical working processes for the constituents in one or more stages. For example, they may be obtained by mechanical working in an internal mixer, in one stage which lasts from 3 to 7 minutes, with a speed of the blades of 50 rpm. Alternatively, the rubber composition is prepared in two stages which last from 3 to 5 minutes and from 2 to 4 minutes, respectively, followed by a finishing stage at about 80° C., during which the sulphur and the vulcanisation accelerators are incorporated for sulphur-crosskinking.

A crown reinforcement for a tire according to the invention comprises a rubber composition such as defined above.

A heavy-vehicle or construction-vehicle tire according to the invention comprises the crown reinforcement described above.

EXAMPLES

The aforementioned characteristics of the present invention, as well as others, will be better understood on reading the following description of several examples of embodiment of the invention, which are given by way of illustration and not of limitation.

In these examples, the properties of the compositions were evaluated as follows:

Mooney Viscosity

The Mooney viscosity ML (1+4) was measured in accordance with Standard ASTM D1646.

Shore A Hardness

The Shore A hardness was measured in accordance with standard ASTM D2240 (1997).

Moduli of Elongation

The moduli of elongation were measured at 10% (M10) at a temperature of 23° C. in accordance with Standard ASTM D412-98 on ASTM C test pieces. These were true secant moduli in MPa. In other words, the secant moduli calculated reduced to the real cross-section of the test piece at the given elongation.

Break Indices

These indices were measured at 100° C. The properties at break, breaking stress FR in MPa and elongation at break AR were measured in % in accordance with Standard ASTM D412-98. The measurements were carried out on ASTM C test pieces.

Tearability Indices

These indices were measured at 100° C. The breaking load (FRD) in N/mm of thickness and the elongation at break (ARD) in % were measured on a test piece of dimensions 10×105×2.5 mm notched at its centre over a depth of 5 mm.

Hysteresis Losses (HL)

The hysteresis losses (HL), or hysteresis, were measured by rebound at 60° C. in accordance with Standard ISO R17667, and were expressed in %.

Dynamic Properties

The dynamic characteristics of the materials were analyzed on a Schenck machine, in accordance with Standard ASTM D 5992-96. The response of a sample of vulcanized material (cylindrical test piece of a thickness of 4 mm and a section of 400 $mm^2$), subjected to an alternating single sinusoidal shearing stress, at a frequency of 10 Hz and at 60° C., was recorded. Scanning was effected at an amplitude of deformation of 0.1 to 50% (outward cycle), then of 50% to 0.1% (return cycle). The maximum shear modulus G*max in MPa and the maximum value of the tangent of the loss angle tan delta max was determined during the outward cycle.

The object of these examples was to compare compositions based on natural rubber (NR hereafter) reinforced with carbon black, with quantities of black of from 52 to 58 phr. These compositions are specified in Table 1 hereafter (in phr).

The "control" composition 1 is representative of the known prior art, and comprised 52 phr of black N347 as reinforcing filler.

Compositions 2 to 7 according to the invention comprised a carbon black A for compositions 2 to 5, or a carbon black B for compositions 6 and 7.

Carbon black A is sold under the name "CRX1416B" by CABOT, and carbon black B is sold under the name "EX 3-3" by COLUMBIAN.

Composition 5 differed from composition 4 in that it furthermore comprised a processing aid sold by RHEIN CHEMIE under the name "AFLUX 42", in order to reduce the viscosity of composition 5 in the non-cross-linked state.

All these compositions were sulphur-cross-linkable.

TABLE 1

|  | Comp. 1 | Comp. 2 | Comp. 3 | Comp. 4 | Comp. 5 | Comp. 6 | Comp. 7 |
|---|---|---|---|---|---|---|---|
| NR | 100 | 100 | 100 | 100 | 100 | 100 | 100 |
| Black N347 | 52 | | | | | | |
| Black A | | 52 | 55 | 58 | 58 | | |
| Black B | | | | | | 55 | 58 |
| ZnO | 9 | 9 | 9 | 9 | 9 | 9 | 9 |
| Stearic acid | 0.65 | 0.65 | 0.65 | 0.65 | 0.65 | 0.65 | 0.65 |
| Antioxidant | 1.50 | 1.50 | 1.50 | 1.50 | 1.50 | 1.50 | 1.50 |
| "AFLUX 42" | | | | | 3 | | |
| Cobalt salt* | 0.20 | 0.20 | 0.20 | 0.20 | 0.20 | 0.20 | 0.20 |
| Insoluble sulphur | 7.6 | 7.6 | 7.6 | 7.6 | 7.6 | 7.6 | 7.6 |
| Accelerator | 0.93 | 0.93 | 0.93 | 0.93 | 0.93 | 0.93 | 0.93 |

*phr of cobalt metal

The natural rubber (NR) which is used was peptized and had a Mooney viscosity ML (1+4) at 100° C. equal to 60.

The antioxidant used was N-(1,3-dimethylbutyl)-N'-phenyl-p-phenylenediamine.

The carbon blacks used are set forth in Table 2 below:

TABLE 2

|  | N347 | Black A | Black B |
|---|---|---|---|
| CTAB in m$^2$/g | 88 | 55 | 50 |
| BET in m$^2$/g | 88 | 53 | 50 |
| IA in mg/g | 90 | 62 | 56 |
| BET/IA | 0.98 | 0.85 | 0.89 |
| DBP in ml/100 g | 124 | 134 | 130 |
| DBPC in ml/100 g | 100 | 94 | 88 |
| dst in nm | 77 | 131 | 133 |
| D50 in nm | 53 | 103 | 113 |
| D50/dst | 0.688 | 0.786 | 0.849 |

These compositions 1 to 7 were obtained by mixing all the aforementioned constituents, except for the cobalt salt, the sulphur and the accelerator, by thermomechanical working in an internal mixer in one step which lasts approximately 4 minutes with a speed of rotation of the blades of 50 rpm, until a dropping temperature of approximately 170° C. was reached. Subsequently, the finishing step was effected at 80° C., during which the cobalt salt, sulphur and vulcanization accelerator were incorporated.

The cross-linking was effected at 150° C. for a time sufficient to achieve 99% of the maximum torque on a rheometer.

The properties in the cross-linked state and in the non-cross-linked state of these compositions 1 to 7 were compared. The results are set forth in Table 3 below.

TABLE 3

|  | Comp. 1 | Comp. 2 | Comp. 3 | Comp. 4 | Comp. 5 | Comp. 6 | Comp. 7 |
|---|---|---|---|---|---|---|---|
| ML (1 + 4) at 100° C. | 52 | 52 | 55 | 58 | 52 | 48 | 52 |
| Shore | 80 | 78 | 80 | 81 | 81 | 77 | 79 |
| M10 in MPa | 9.13 | 7.67 | 8.03 | 8.94 | 9.49 | 8.27 | 8.92 |
| as base 100 | 100 | 84 | 88 | 98 | 104 | 89 | 96 |
| HL in % | 22.85 | 17.13 | 17.13 | 18.05 | 18.96 | 16.85 | 18.00 |
| as base 100 | 100 | 75 | 75 | 79 | 83 | 74 | 79 |
| G* max 60° C. | 8.24 | 5.76 | 6.43 | 8.82 | 8.04 | | |
| as base 100 | 100 | 70 | 78 | 107 | 97 | | |
| Tan delta max 60° C. | 0.163 | 0.130 | 0.132 | 0.142 | 0.139 | | |
| as base 100 | 100 | 80 | 81 | 87 | 85 | | |
| Breakage 100° C. | | | | | | | |
| FR in MPa | 16.0 | 14.7 | 14.1 | 15.1 | 14.1 | 14 | 14 |
| AR in % | 360 | 360 | 326 | 323 | 308 | 359 | 364 |
| Tearability 100° C. | | | | | | | |
| FRD in N/mm | 30 | 33 | 38 | 34 | 25 | 36 | 29 |
| ARD in % | 97 | 84 | 87 | 87 | 77 | 88 | 85 |

It would appear that the carbon blacks A or B imparted to compositions 4, 5 and 7 according to the invention hysteresis properties at high deformation (HL at 60° C.) which were improved by 17% to 21% relative to those of the "control" composition comprising the black N347. The compositions according to the invention have a modulus of elongation at low deformation (M10), which is close to that of said "control" composition, making these compositions according to the invention particularly well suited for use in the crown reinforcement of tires intended to bear heavy loads.

It will be noted that the other properties of these compositions 4, 5 and 7 according to the invention were comparable to those of said "control" composition.

It will also be noted that the incorporation in the composition 5 of the processing aid imparted to this composition 5 a viscosity in the non-cross-linked state. Consequently, composition 5 exhibited a processing ability which was similar to that of the "control" composition, and practically without adversely affecting the hysteresis properties of this composition 5.

I claim:

1. A heavy-vehicle or construction vehicle tire, comprising a crown and a tread, the crown including a crown reinforcement comprising a cross-linkable or cross-linked rubber composition having a reduced hysteresis in the cross linked state, said composition comprising:
    an elastomeric matrix comprising natural rubber or a synthetic polyisoprene in a majority proportion of the matrix, and
    a reinforcing filler comprising a carbon black,
    wherein said carbon black satisfies the following conditions:
        (i) $50 \leq$ CTAB specific surface area in $m^2/g$ (in accordance with Standard ASTM D3765-80)$\leq 55$,
        (ii) $45 \leq$ BET specific surface area in $m^2/g$ (in accordance with Standard D4820-93)$\leq 70$,
        (iii) $45 \leq$ iodine adsorption index IA in mg/g (in accordance with Standard ASTM D1510-81)$\leq 70$,
        (iv) ratio (BET surface area / index IA)$\leq 1.05$,
        (v) $115 \leq$ DBP structure value in ml/100 g (in accordance with Standard ASTM D2414-93)$\leq 170$,
        (vi) $85 \leq$ Stokes diameter dst in nm$\leq 145$,
    wherein dst is the diameter of aggregates corresponding to the maximum frequency of the Stokes diameters in a distribution of aggregates, and
        (vii) $D50/dst \geq 0.0090 \cdot CTAB + 0.19$,
    wherein D50 is the difference, in the distribution of aggregates, between the Stokes diameters of two aggregates corresponding to one and the same frequency equal to 50% of the maximum frequency of the Stokes diameters, dst and D50 being measured by centrifugal photosedimentometry.

2. The tire according to claim 1, wherein said carbon black further satisfies the following condition:
    (viii) $80 \leq$ DBPC structure value in ml/100 g (in accordance with Standard ASTM D3493-91)$\leq 130$,
    wherein DBPC is measured after 4 compressions at 24,000 psi.

3. The tire according to claim 2, wherein said condition (viii) is as follows:
    (viii) $85 \leq$ DBPC structure value in ml/100 g$\leq 125$.

4. The tire according to claim 1, wherein said conditions (ii) and (iii) are as follows:
    (ii) $50 \leq$ BET specific surface area in $m^2/g \leq 65$, and
    (iii) $50 \leq$ iodine adsorption index IA in mg/g$\leq 65$.

5. The tire according to claim 1, wherein said condition (v) is as follows:
    (v) $120 \leq$ DBP structure value in ml/100 g$\leq 165$.

6. The tire according to claim 1, wherein said condition (vi) is as follows:
    (vi) $90 \leq$ Stokes diameter dst in nm$\leq 140$.

7. The tire according to claim 1, wherein said condition (vii) is as follows:
    (vii) $D50/dst \geq 0.0092 \cdot CTAB + 0.21$.

8. The tire according to claim 1, wherein said elastomeric matrix consists of natural rubber or synthetic polyisoprene.

9. The tire according to claim 1, wherein said elastomeric matrix comprises a blend of natural rubber or synthetic polyisoprene and at least one additional diene elastomer,
    wherein the diene elastomer is selected from the group consisting of polybutadienes, styrene-butadiene copolymers prepared in solution or in emulsion, butadiene-isoprene copolymers and styrene-butadiene-isoprene terpolymers,
    wherein the natural rubber or synthetic polyisoprene is present in said composition in a quantity greater than 70 phr (phr: parts by weight per hundred parts of elastomers).

10. The tire according to claim 1, wherein said carbon black represents the majority proportion of said reinforcing filler.

11. The tire according to claim 10, wherein said reinforcing filler further comprises reinforcing inorganic filler.

12. The tire according to claim 11, wherein said reinforcing inorganic filler is silica.

13. The tire according to claim 1, wherein said carbon black is present in a quantity of from about 30 to about 70 phr.

* * * * *